US011308543B1

(12) United States Patent
Mantha et al.

(10) Patent No.: US 11,308,543 B1
(45) Date of Patent: Apr. 19, 2022

(54) METHODS AND APPARATUS FOR AUTOMATICALLY PROVIDING PERSONALIZED CAROUSELS

(71) Applicant: Walmart Apollo LLC, Bentonville, AR (US)

(72) Inventors: Aditya Mantha, San Jose, CA (US); Shubham Gupta, Sunnyvale, CA (US); Anirudha Sundaresan, Sunnyvale, CA (US); Gaoyang Wang, San Jose, CA (US); Shashank Kedia, Sunnyvale, CA (US); Yokila Arora, Sunnyvale, CA (US); Parveenkumar Kanumala, Newark, CA (US); Stephen Dean Guo, Saratoga, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/129,539

(22) Filed: Dec. 21, 2020

(51) Int. Cl.
| | | |
|---|---|---|
| *G06Q 30/00* | (2012.01) | |
| *G06Q 30/06* | (2012.01) | |
| *G06F 16/9535* | (2019.01) | |
| *G06F 16/9538* | (2019.01) | |
| *G06Q 30/02* | (2012.01) | |

(Continued)

(52) U.S. Cl.
CPC ... *G06Q 30/0631* (2013.01); *G06F 16/24578* (2019.01); *G06F 16/9535* (2019.01); *G06F 16/9538* (2019.01); *G06Q 30/0255* (2013.01); *G06Q 30/0269* (2013.01); *G06Q 30/0641* (2013.01); *G06F 3/14* (2013.01)

(58) Field of Classification Search
CPC .......... G06Q 30/0631; G06Q 30/0255; G06Q 30/0269; G06Q 30/0641; G06F 16/9535; G06F 16/24578; G06F 16/9538
See application file for complete search history.

(56) References Cited

U.S. PATENT DOCUMENTS

| | | | |
|---|---|---|---|
| 7,689,457 B2 * | 3/2010 | Chan ................. | G06Q 30/0641 705/26.7 |
| 7,693,827 B2 | 4/2010 | Zamir et al. | |
| 8,756,121 B2 | 6/2014 | Gonsalves et al. | |

(Continued)

OTHER PUBLICATIONS

Mantha et al., "A Real-Time Whole Page Personalization Framework for E-Commerce", 2020, p. 1-5.*

(Continued)

*Primary Examiner* — Kathleen Palavecino
(74) *Attorney, Agent, or Firm* — Duane Morris LLP; Manita Rawat (57) ABSTRACT

This application relates to apparatus and methods for automatically determining and providing carousels specifically curated for a user. In some examples, a computing device obtains user transaction data identifying in-store and/or online transactions, and user engagement data identifying user interactions with items and carousels from user's prior sessions. The computing device determines a sequential order for presentation of carousels with a set of item recommendations. For example, the computing device scores each potential carousel based on prior user interactions and transactions with items and carousels. The carousels are then ranked and subsequently presented to the user based on their corresponding scores.

17 Claims, 6 Drawing Sheets

(51) Int. Cl.
*G06F 16/2457* (2019.01)
*G06F 3/14* (2006.01)

(56) References Cited

U.S. PATENT DOCUMENTS

| | | | |
|---|---|---|---|
| 10,565,615 | B2 | 2/2020 | Burr et al. |
| 10,740,825 | B1* | 8/2020 | Zhang ............... G06F 16/24575 |
| 2015/0169727 | A1* | 6/2015 | Araki .................... G06F 16/353 |
| | | | 707/737 |
| 2017/0366587 | A1* | 12/2017 | Sharifi .................... H04L 67/22 |
| 2018/0137552 | A1* | 5/2018 | Zhu .................... G06Q 30/0631 |
| 2019/0244229 | A1 | 8/2019 | Szulczewski et al. |
| 2019/0362408 | A1* | 11/2019 | Srinivasan ......... G06Q 30/0631 |
| 2020/0364280 | A1* | 11/2020 | Puri ....................... G06Q 30/02 |

OTHER PUBLICATIONS

Alvino et al., "Learning a Personalized Homepage", 2015, p. 1-12.

* cited by examiner

METHODS AND APPARATUS FOR AUTOMATICALLY PROVIDING PERSONALIZED CAROUSELS

TECHNICAL FIELD

The disclosure relates generally to digital recommendations and, more specifically, to electronically determining and providing personalized digital carousels with item recommendations.

BACKGROUND

At least some websites, such as retailer websites (e.g., e-commerce platforms), display item recommendations (e.g., advertisements). For example, a website may display item recommendations, and may further allow a customer to purchase recommended items. The displayed recommendations may be determined by recommendation systems, which may attempt to provide recommendations for items which the customer may be interested in. Some websites use carousels to organize the item recommendations based on different objectives. For example, one carousel may include previously unseen items while another carousel may include previously ordered items. In some examples, however, carousels may not be listed based on user preferences. For example, the carousels may be positioned in a global and static manner for all users, so that all users may be presented with the same set of ordered carousels. The carousels may be listed in the same order for highly engaged users, nursery users and new users, alike. For example, users that like to engage with new items may see the same carousels as users that prefer to purchase previously ordered or familiar items. In this way, in some examples, the item recommendation systems may provide recommendations for items (i.e., items within carousels) that the customer finds irrelevant or is not interested in. For example, although a customer may be interested in viewing carousels with recommendations for and purchasing previously purchased items, the item recommendation system may nonetheless provide carousels with recommendations for new items that the user is uninterested in. In some examples, the customer may even be embarrassed by a displayed recommendation.

As a result, a retailer may lose sales of items to a customer. For example, the customer may not buy the recommended item. In addition, the customer may leave the website without having purchased an item that, if shown a recommendation for, the customer would have purchased. In some examples, if a customer perceives a recommendation as irrelevant or embarrassing, the customer may go elsewhere, such as another website, to make purchases. As such, there are opportunities to address item recommendation systems, particularly related to the presentation of carousels with different objectives in a user personalized manner.

SUMMARY

The embodiments described herein are directed to automatically determining and providing personalized digital carousels with item recommendations that may be displayed, for example, on a website. The embodiments may allow a person, such as a customer, to be presented with carousels including item recommendations that may be more likely to interest the person. For example, the embodiments may allow the person to view personalized carousels with recommendations that the person may be more willing to purchase. In some examples, the embodiments may provide ranking processes that determine the carousels to advertise based on historical user transactions, and user engagement with items and carousels. In some examples, the carousels are personalized to each person, e.g., the order of carousels are personalized to each person. As a result, the embodiments may allow a retailer to present more relevant carousels with item recommendations to each person, thereby increasing the chances that the person will purchase the recommended items. In addition, because a person may now spend less time reviewing irrelevant carousels and recommendations, the person may have additional time to consider additional items for purchase. In addition to or instead of these example advantages, persons of ordinary skill in the art having the benefit of these disclosures would recognize and appreciate other advantages as well.

In accordance with various embodiments, exemplary systems may be implemented in any suitable hardware or hardware and software, such as in any suitable computing device. For example, in some embodiments, a computing device is configured to obtain user data (e.g., user transaction data, user engagement data) associated with a customer and a plurality of carousels, each carousel including a set of items (e.g., recommendations). The computing device may be further configured to determine a user-carousel score for each carousel of the plurality of carousels based on the user data. The user-carousel score indicating a likelihood of the user engaging with the carousel. In some examples, the user-carousel score is based on one or more of a user-item affinity scores, a user-carousel prior score, user-category discovery scores, a user-carousel repeat score, and a user-carousel discovery score. The user-carousel repeat score may indicate a likelihood of the user interacting with a particular carousel based on a user-item affinity scores (e.g., propensity of a user to buy an item within the carousel) and user-carousel prior score (e.g., likelihood of a user to interact with the carousel based on past interactions with the same carousel). The user-carousel discovery score may indicate a likelihood of a user wanting to explore items in the carousel based at least in part on the user-category discovery scores (e.g., likelihood of a user wanting to explore items within a particular category). In some examples, the user-carousel repeat score and use-carousel discovery score for a carousel may be aggregated to determine the user-carousel score for the corresponding carousel for the user. The computing device may also be configured to present the plurality of carousels to the users based on the user-carousel scores for the corresponding carousels.

In some examples, the computing device is configured to rank the plurality of carousels based on the user-carousel scores of the corresponding carousels, and presenting the carousels with the highest ranked carousel on the top. In some examples, the computing device is configured to transmit the ranked carousels to another computing device.

In some embodiments, a method is provided that includes obtaining user data (e.g., user transaction data, user engagement data) associated with a customer and a plurality of carousels, each carousel including a set of items (e.g., recommendations). The method further includes determining a user-carousel score for each carousel of the plurality of carousels based on the user data. The user-carousel score indicating a likelihood of the user engaging with the carousel. In some examples, the user-carousel score for a carousel may be determined by aggregating a user-carousel repeat score and a user-carousel discovery score for the corresponding carousel for the user. The method may also include presenting the plurality of carousels to the users based on the user-carousel scores for the corresponding carousels.

In some examples, the method includes ranking the plurality of carousels based on the user-carousel scores of the corresponding carousels, and presenting the carousels with the highest ranked carousel on the top. In some examples, the method includes transmitting the ranked carousels to another computing device.

In yet other embodiments, a non-transitory computer readable medium has instructions stored thereon, where the instructions, when executed by at least one processor, cause a computing device to perform operations that include obtaining user data (e.g., user transaction data, user engagement data) associated with a customer and a plurality of carousels, each carousel including a set of items (e.g., recommendations). The operations may also include determining a user-carousel score for each carousel of the plurality of carousels based on the user data. The user-carousel score indicating a likelihood of the user engaging with the carousel. In some examples, the user-carousel score for a carousel may be determined by aggregating a user-carousel repeat score and a user-carousel discovery score for the corresponding carousel for the user. The operations may further include presenting the plurality of carousels to the users based on the user-carousel scores for the corresponding carousels.

In some examples, the operations include ranking the plurality of carousels based on the user-carousel scores of the corresponding carousels, and presenting the carousels with the highest ranked carousel on the top. In some examples, the operations include transmitting the ranked carousels to another computing device.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
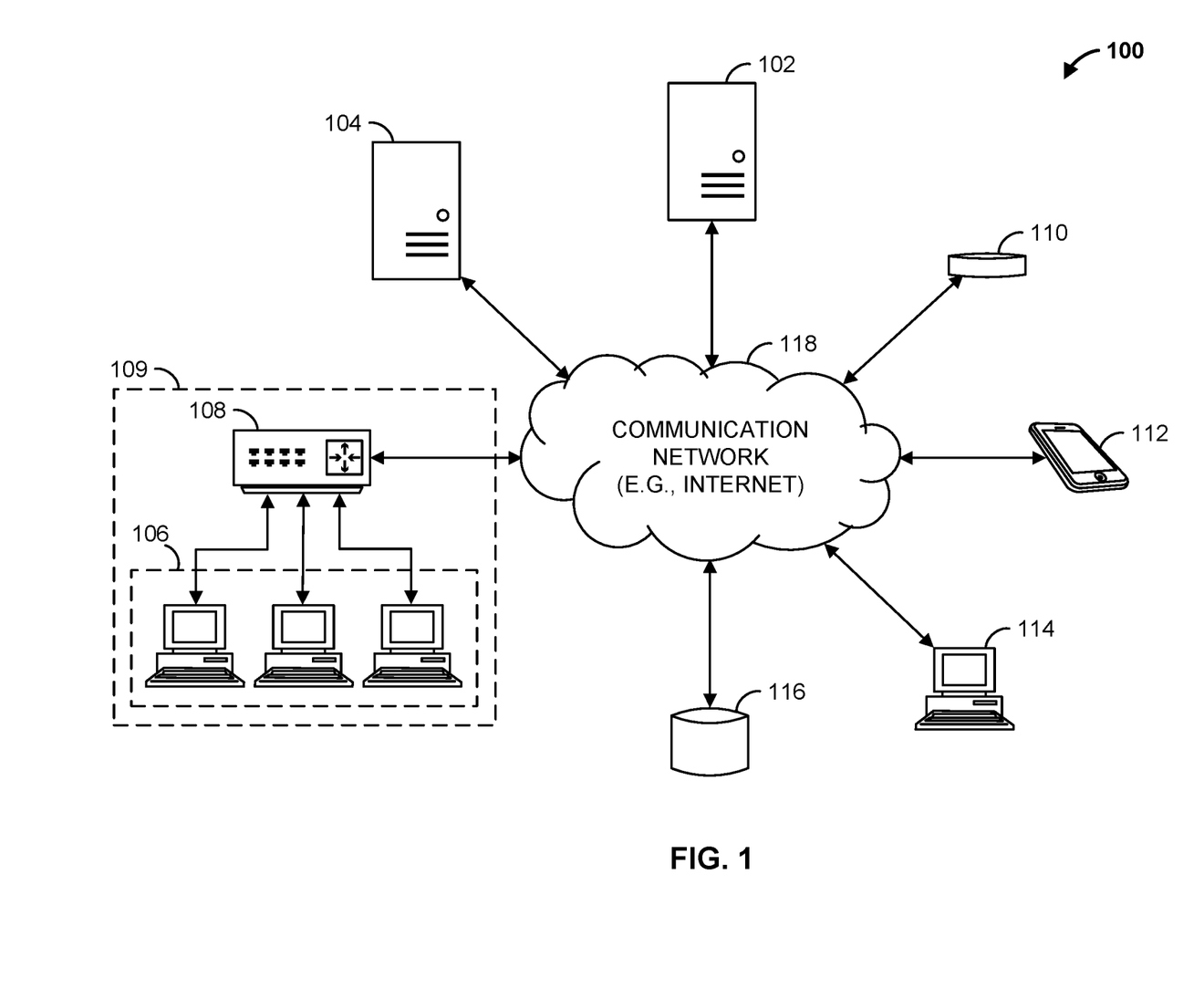
FIG. 1 is a block diagram of a digital carousel customization system in accordance with some embodiments.

Turning to the drawings, FIG. 1 illustrates a block diagram of a digital carousel customization system 100 that includes a carousel customization computing device 102 (e.g., a server, such as an application server), a web server 104, workstation(s) 106, database 116, and multiple customer computing devices 110, 112, 114 operatively coupled over network 118. Carousel customization computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, carousel customization computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, carousel customization computing device 102 is operated by a retailer, and multiple customer computing devices 112, 114 are operated by customers of the retailer.

Although FIG. 1 illustrates three customer computing devices 110, 112, 114, digital carousel customization system 100 can include any number of customer computing devices 110, 112, 114. Similarly, digital carousel customization system 100 can include any number of workstation(s) 106, recommendation customization computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with carousel customization computing device 102 over communication network 118. The workstation(s) 106 may send data to, and receive data from, carousel customization computing device 102. For example, the workstation(s) 106 may transmit data related to an order purchased by a customer at store 109 to carousel customization computing device 102. In response, carousel customization computing device 102 may transmit an indication of one or more carousels with one or more item recommendations (e.g., ranked item recommendations) to provide to the purchasing customer. For example, the carousels may be displayed on a receipt handed to the customer for the purchase order.

In some examples, web server 104 may host one or more web pages, such as a retailer's website. Web server 104 may transmit data related to an order purchased on the website by a customer to carousel customization computing device 102. In response, carousel customization computing device 102 may transmit an indication of one or more carousels with one or more item recommendations to display on the website to the purchasing customer. For example, the carousels may be displayed on a checkout webpage, on a homepage, or on a webpage dedicated to an objective or a category of a carousel when the customer is browsing that webpage.

First customer computing device 110, second customer computing device 112, and $N^{th}$ customer computing device 114 may communicate with web server 104 over communication network 118. For example, each of multiple computing devices 110, 112, 114 may be operable to view, access, and interact with webpages of a website hosted by web server 104. In some examples, web server 104 hosts a website for a retailer that allows for the purchase of items. For example, the website may list prices for recommended items. An operator of one of multiple computing devices 110, 112, 114 may access the website hosted by web server 104, add one or more items to an online shopping cart of the website, and perform an online checkout of the shopping cart to purchase the items for the listed prices.

Carousel customization computing device 102 is operable to communicate with database 116 over communication network 118. For example, carousel customization computing device 102 can store data to, and read data from, database 116. Database 116 can be a remote storage device, such as a cloud-based server, a memory device on another application server, a networked computer, or any other suitable remote storage. Although shown remote to carousel customization computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Carousel customization computing device 102 can generate, for each of a plurality of customers, carousels including items (e.g., recommendations) that a customer may be interested in. For example, carousel customization computing device 102 may identify a ranked list of carousels, each including a ranked list of items for a particular customer. For example, "recommended for you," "sliced bread," "summer grilling," and "reorder your essentials" carousels may be ranked and presented in that order for a first customer based on second user's preferences (e.g., transaction data, engagement data). "Reorder your essentials," "fresh vegetables," "sliced bread," and "recommended for you" carousels may be ranked and presented in that ranked order for a second customer based on second user's preferences (e.g., transaction data, engagement data). In some examples, the "reorder your essentials" carousel may be ranked and presented higher for a user who is more likely to prefer previously purchased or familiar items but ranked and presented lower for a user who is more likely to prefer engaging with new or unseen items. Based on the ranked carousels for the customer, carousel customization computing device 102 can determine one or more carousels and their orders to present to the customer as recommendations for items.

To determine an order for presenting carousels for a customer, in some examples, carousel customization computing device 102 obtains online transaction data, engagement data and/or in-store transaction data for a particular customer. The in-store transaction data may identify previous purchases the customer has made in a store, such as store 109. Carousel customization computing device 102 may also obtain online purchase data for the particular customer. The online transaction data may identify previous purchases the customer the customer has made online, such as from a website hosted by web server 104. Carousel customization computing device 102 may further obtain online engagement data for the customer, such as from web server 104. The online engagement data may identify data associated with online sessions, such as an online session the customer engaged in when viewing the website. For example, online engagement data may identify one or more of: carousels the customer has viewed; recommendations the customer has viewed; recommendations the customer has clicked on; items that the customer added to an online shopping cart; items that the customer has clicked on; and search queries, for example.

Carousel customization computing device 102 can then execute one or more processes (e.g., algorithms) that operate on the in-store transaction data, online transaction data, and/or online engagement data to rank and/or order one or more carousels with the customer in real-time or near real-time. In some examples, carousel customization computing device 102 generates ranked carousels that identify the carousels in order of likelihood of the customer (e.g., user) interacting with items (e.g., recommendations) in the corresponding carousel. Carousel customization computing device 102 may then identify a sequence of carousels based on the ranks, and provide the carousels for display to web server 104.

In some examples, the processes include determining a repeat score and a discovery score for each potential carousel. The repeat score may indicate a likelihood of the user interacting with a particular carousel based on past interactions or purchases. The discovery score may indicate a likelihood of a user wanting to explore items in the carousel based on past interactions and/or purchases. A higher repeat score may indicate that the user prefers to interact and/or purchase previously bought or interacted with items. A higher discovery score may indicate that the user prefers to interact with or explore new items.

In some example, carousel customization computing device 102 can also execute processes to determine a user-item affinity score for the carousel indicating propensity of the user to buy an item within the carousel. Processes may also include determining a user carousel prior score indicating a likelihood of a user to interact with the carousel based on part interactions with the same carousel. Further, the processing may include determining a user category discovery score indicating a likelihood of the user wanting to explore items within a particular category. Each score may be determined based on user data, including user transaction data and user engagement data. Repeat score for a carousel may be determined by aggregating the user-item affinity score and the user carousel prior score. The discovery score may be based on the user category score. The repeat score and the discovery score may be aggregated to determine the overall score for the potential carousel for the user.

In some examples, carousel customization computing device 102 may rank the potential carousels for the user (e.g., customer) based on the carousel scores. The carousels may then be ordered and presented to the user based on the corresponding ranks and/or scores. In this way, a user may be presented with carousels based on identifying whether the user prefers to explore new items or prefers to interact or buy previously bought and/or seen items.

In some examples, carousel customization computing device 102 applies the rankings to order carousels with recommended recommendations, such as those provided from a recommendation system (e.g., from a third party), to the customer (e.g., user). For example, carousel customization computing device 102 may receive recommended carousels with ranked recommendations for a customer browsing a website hosted by web server 104. Carousel customization computing device 102 may order one or more of the carousels based on user transactions and engagements related to the carousels. In some examples, carousel customization computing device 102 scores the carousels based on data (e.g., metadata) associated with each carousel and and/or associated recommendations (e.g., items) within the carousel. The carousels are ranked based on the scores and presented in a sequence based on the corresponding scores and/or ranks (e.g., is displayed on the website hosted by web server 104).

In some examples, carousel customization computing device 102 trains machine learning processes. The machine learning processes may be trained with historical in-store transaction data, historical online transaction data, and/or historical engagement data. In some examples, the machine learning process is trained with historical online transaction data that identifies, for example, an order that items were added to cart. The machine learning processes learn which item type (e.g., previously encountered item, new item, unseen item) the user is more likely to engage with, and which the user is less likely to engage with, for example. With training, carousel customization computing device 102 identifies an optimal set of parameters and, more specifically, values for the optimal set of parameters that are employed by the machine learning process.

User-Item Affinity Scores

In some examples, user transaction data (e.g., online transaction data, in-store transaction data) and user engagement data are obtained from database 116 to determine user-item affinity scores for each item within each potential carousel. User-item affinity score for an item may indicate a propensity or likelihood of the user buying the item. As noted above, the user-item affinity scores are then used to compute user-carousel scores for each carousel to rank the potential carousels.

In some examples, carousel customization computing device 102 generates an item model based on matrix factorization to learn user and item embeddings. User transaction data may be used to identify items bought by the user during prior transactions. A Bayesian personalized ranking model may be used to train the item model to learn the embeddings. The Bayesian personalized ranking model may be a machine learning model (e.g., deep learning based neural network). The model may be trained using item pairs $(u, i, j) \in D_s$, where user u is assumed to prefer item i over item j, and $D_s$ is the training dataset. A likelihood function may then be learned as follows:

$$p(\Theta|>_u) \propto p(>_u|\Theta)p(\Theta) \quad \text{eq. 1}$$

where $\Theta$ represents the parameter vector of an arbitrary model class, $>_u$ represents the desired but latent preference structure for user u, $(\Theta|>_u)$ represents a user specific likelihood function, and $p(\Theta) \sim N(0, \Sigma_\Theta)$ represents a prior probability indicating a normal distribution with 0 mean and variance-covariance matrix.

It can be assumed that each user would act independently of others and the ordering of each pair of items (i, j) for a specific user is independent of the ordering of every other item pair of items. Carousel customization computing device 102 may then determine the individual probability that a user prefers item i over item j using the following:

$$p(i>_u j|\Theta):=\sigma(\hat{r}_{uij}((\Theta))) \quad \text{eq. 2}$$

where $\sigma$ may be formulated as a logistic sigmoid $$\sigma(x) := \frac{1}{1+e^{-x}}.$$

The loss function of the user model may then be optimized during training using user transaction data associated with all users as follows:

$$\Sigma_{(u,i,j) \in D_s} \ln \sigma(\hat{r}_{uij}) - \lambda_\Theta \|\Theta\|^2 \quad \text{eq. 3}$$

$$\hat{r}_{uij} := \hat{r}_{ui} - \hat{r}_{uj} \quad \text{eq. 4}$$

Where $\hat{r}_{ui}$ represents the predicted user-item affinity score for item i, and $\hat{r}_{uj}$ is the predicted user-item affinity score for item j in a corresponding carousel.

In some examples, carousel customization computing device 102 may estimate matrix R: U X I to determine the user-item affinity score, $\hat{r}_{ui}$, for item i, where U and I represent the total number of users and items in the training dataset, respectively. A user-item affinity score may be determined for each user and item in the dataset. In some examples, matrix dot product approach may be used to predict the user-item affinity matrix, $\hat{R}:=WH^t$, as the user model is trained to produce, where R represents the target matrix, $\hat{R}$ represents the estimated matrix, W: |U|×k, H:|I|× k, where W, H are two low rank matrices representing users and items in the embeddings, respectively, and k is a hyper parameter (e.g., rank of approximation) based on dimensions of the W and H matrices. In some examples dimensions of the two vectors are the same. Row $w_u$ in W is a feature vector representing user U, and row $h_i$ in H is a feature vector representing item I in the embeddings. The user-item affinity score for an item i in the carousel may then be determined by the user model of the carousel customization computing device 102 as follows:

$$\hat{r}_{ui} = \langle w_u | h_i \rangle = \sum_{f=1}^{k} h_{if} \cdot w_{uf} \quad \text{eq. 5}$$

User-item affinity score for each item within a carousel may be determined. The user-item affinity scores for the carousel may be stored in database 116. User-item affinity scores may be determined for each carousel (i.e., for each item in the corresponding carousel).

User-Category Discovery Scores

In some examples, carousel customization computing device 102 trains a category model using the user engagement data (e.g., stored in database 116) to generate, for each carousel, user-category discovery score for each category that items within the carousel belong to. Category model may be trained in a similar manner using user and category embeddings as the item model with respect to the user-item affinity scores described above. In such examples, user-category discovery score for user u and category c may be determined by the category model as follows:

$$\hat{s}_{uc} = \langle w_u | h_c \rangle = \sum_{j=1}^{k} h_{cf} \cdot w_{uf} \cdot e^{-\#_{uc}} \quad \text{eq. 6}$$

where $\#_{uc}$ represents the number of interactions between user u and category c from the user engagement data, and H=|C|×k, representing feature vector for category C.

User-category discovery score for each category within a carousel may be determined. User-category discovery scores for the carousel may be stored in database 116. User-category discovery scores may be determined for each carousel (i.e., for each category in the corresponding carousel).

User-Carousel Prior Scores

In some examples, carousel customization computing device 102 may obtain user transaction data and user engagement data from database 116 to determine user-carousel prior scores for each of the potential carousels. User-carousel prior score may indicate a prior on a likelihood of the user to interact with the corresponding carousel. Carousel customization computing device 102 may use a carousel prior model to generate and/or determine the user-carousel prior scores for each of the potential carousels. The user-carousel prior score may be dependent on the user's engagement or interaction (e.g., add to cart, click, views, etc.) with the corresponding carousel during past user session (e.g., in user engagement data). In some examples, a beta distribution algorithm may be used to model user-carousel interactions from user feedback data corresponding to the carousel in the user engagement data. For example, it may be determined how many times the user interacted with the corresponding carousel out of the number of times the carousel was presented to the user. In some examples, for new users, or users for whom less engagement data is available, global priors (e.g., engagement data for other users) may be used to generate the user-carousel prior score. In yet another example, for newly introduced carousel or carousel not presented to the user in prior user sessions, global priors may be used to model the interactions with the carousels.

In some examples, the carousel prior model may use a beta-prior distribution to determine or generate user-carousel prior scores for potential carousels. The model may take as input prior user engagement data associated with the corresponding carousel as input. For K carousels denoted by {1, 2, 3, . . . , K}, the parameters for the beta-prior distribution may be denoted as α=(α$_1$, α$_2$, α$_3$, . . . , α$_K$) and β=(β$_1$, β$_2$, β$_3$, . . . , β$_K$) for positive interaction with the corresponding carousel and negative interaction with the corresponding carousel, respectively. The carousel prior model may determine a probability of the user interacting with carousel k as follows:

$$P(\theta_k) = \frac{\Gamma(\alpha_k + \beta_k)}{\Gamma(\alpha_k)\Gamma(\beta_k)} \theta_k^{\alpha_k - 1} (1 - \theta_k)^{\beta_k - 1} \quad \text{eq. 7}$$

where for any positive integer n, Γ(n)=(n−1)! In some example, Bayes' rule may be used to update the posterior distribution as user interacts with the carousels over time and sessions. The posterior distribution of each potential carousel may be a beta distribution with the following parameters:

$$(\alpha_k, \beta_k) \leftarrow \begin{cases} (\alpha_k + 1, \beta_k), & ATC \text{ or Click} \\ (\alpha_k, \beta_k + 1), & \text{View but neither } ATC \text{ nor click} \\ (\alpha_k, \beta_k), & \text{No Interaction} \end{cases} \quad \text{eq. 8}$$

The user-carousel prior score may then be determined for carousel k as follows, based on the parameters of the beta-distribution at any given time:

$$\hat{\theta} = \frac{\alpha_k}{\alpha_k + \beta_k} \quad \text{eq. 9}$$

It could be noted that the user-carousel prior score may be an average of the probability as described by eq. 7. In some examples, the user-carousel prior scores may be determined daily. Carousel prior model may generate or determine user-carousel prior scores for each potential carousel. The scores may be stored in database 116 for later retrieval in real-time.

User-Carousel Repeat Scores

In some examples, carousel customization computing device 102 may determine a user-carousel repeat score for each of the potential carousels based on the corresponding user-item affinity scores and the user-carousel prior score. The user-carousel repeat score may indicate a likelihood of the user to interact with items in the corresponding carousel based on prior user transactions and engagement with the carousel and the items corresponding to the carousel. In some examples, user-carousel repeat score for a carousel may be determined by aggregating the corresponding user-item affinity score and the user-carousel prior score associated with the carousel.

A repeat model may be used to generate and/or determine the user-carousel repeat scores. For example, the user-carousel repeat score, $\alpha_{uc}$, for a carousel with user-item affinity score $\hat{r}_{ui}$ and user-carousel prior score $\lambda_{uc}$, may be aggregated as follows:

$$\alpha_{uc} = \lambda_{uc} \times \sum_{j=1}^{k} \frac{\hat{r}_{ui_j}}{\log_2(1+j)} = \quad \text{eq. 10}$$

$$\lambda_{uc} \times \sum_{j=1}^{k} \frac{x_u^T y_{i_j}}{\log_2(1+j)} = \lambda_{uc} \times u_u^T \left( \sum_{j=1}^{k} \frac{y_{i_j}}{\log_2(1+j)} \right)$$

where carousel c includes items {i$_1$, i$_2$, i$_3$, . . . , i$_k$}, with k number of items. In this way, a logarithmic reduction factor (e.g., decaying factor log$_2$ (1+j)) may be used to aggregate the user-carousel prior score and the user-item affinity scores in order to assign a higher weight to items in the beginning of the corresponding carousel to account for horizontal interaction bias, that is, an assumption that the user is more likely to interact with the first item in the carousel than the second item, and so on. To simplify the aggregation, in some examples, the user-carousel repeat score may be determined as follows:

$$\alpha_{uc} = \lambda_{uc} \times \sum_{j=1}^{k} \frac{\hat{r}_{uij}}{k} = \lambda_{uc} \times \sum_{j=1}^{k} \frac{x_u^T y_{ij}}{k} = \lambda_{uc} \times u_u^T \left( \sum_{j=1}^{k} \frac{y_{ij}}{k} \right) \quad \text{eq. 11}$$

In this way, the repeat model may generate or determine a user-carousel repeat score for each potential carousel. The user-carousel repeat scores may be stored in the database 116 for later retrieval.

User-Carousel Discovery Scores

In some examples, carousel customization computing device 102 may determine a user-carousel discovery score for each carousel based on the corresponding user-category discovery score. User-carousel discovery score for a carousel may indicate a likelihood of a user wanting to explore items in the carousel. In some examples, user-category discovery scores may be aggregated for all items in a corresponding carousel to determine the associated user-carousel discovery score. In some examples, user-category discovery scores for all categories of items in the carousel may be aggregated to generate the user-carousel discovery score.

In some examples, carousel customization computing device may use a discovery model to determine a user-carousel discovery score for each carousel. A user-carousel discovery score, $\gamma_{uc}$, may be determined by aggregating user-category discovery scores, $\hat{s}_{uc}$, for each item with each category as follows:

$$\gamma_{uc} = \sum_{j=1}^{k} \frac{\hat{s}_{ucj}}{\log_2(1+j)} \quad \text{eq. 12}$$

where $\hat{s}_{uc}$ represents the user-category discovery score for user u and category c, and carousel c includes k number of items denoted by $\{i_1, i_2, i_3, \ldots, i_k\}$. In this way, a logarithmic reduction factor may be used to aggregate the user-category discovery scores in order to assign a higher weight to items in the beginning of the corresponding carousel to account for horizontal interaction bias, that is, an assumption that the user is more likely to interact with the first item in the carousel than the second item, and so on. To simplify the aggregation, in some examples, the user-carousel discovery score may be determined as follows:

$$\gamma_{uc} = \sum_{j=1}^{k} \frac{\hat{s}_{ucj}}{k} \quad \text{eq. 13}$$

In this way, the discovery model may generate or determine a user-carousel discovery score for each potential carousel. The user-carousel discovery scores may be stored in the database 116 for later retrieval.

Final User-Carousel Scores

In some examples, final scores (i.e., user-carousel scores) may be determined for each carousel that indicates a likelihood of the user interacting with corresponding carousels that leverages both exploratory (e.g., discovery) and exploitative (e.g., repetitive) traits of the particular user. In some examples, a final user-carousel score may be determined by aggregating the user-carousel repeat score and the user-carousel discovery score for the corresponding carousel. In an example, weights may be assigned to the discovery (i.e., user-carousel discovery score) and the repeat score (i.e., user-carousel repeat score) to determine the final score. The weights assigned to each of the discovery and the repeat score may be pre-determined by the retailer.

Carousel customization computing device 102 may aggregate the discovery score and the repeat score for each corresponding carousel to generate final user-carousel scores. For example, for a potential carousel with a discovery score, $\gamma_{uk}$, and a repeat score, $\alpha_{uk}$, a carousel model of carousel customization computing device 102 may aggregate the discovery and repeat scores to determine the final user-carousel score for a carousel k for user u as follows:

$$\zeta_{uk} = w\alpha_{uk} + (1-w)\gamma_{uk} \quad \text{eq. 14}$$

where w represents a weight assigned to the repeat score and (1−w) represents the weight assigned to the discovery score. In some examples the weight, w, assigned to the repeat score may be determined using an argmax function to optimize across all users as follows:

$$\forall u \underset{top\ n}{\operatorname{argmax}} \zeta_{uk} = w\alpha_{uk} + (1-w)\gamma_{uk} \quad \text{eq. 15}$$

Once the weight has been optimized, it may be used to determine the final user-carousel scores for the corresponding carousels and the particular user.

In this way, the carousel model may generate or determine a user-carousel discovery score (i.e., final score) for each potential carousel. The user-carousel scores may be stored in the database 116 for later retrieval. The user-carousel scores may be used to rank the carousels prior to presenting or displaying the carousels using an interface of a computing device of the user. The carousels may be presented in an order determined by the ranks assigned to the carousels.

Figure 2:
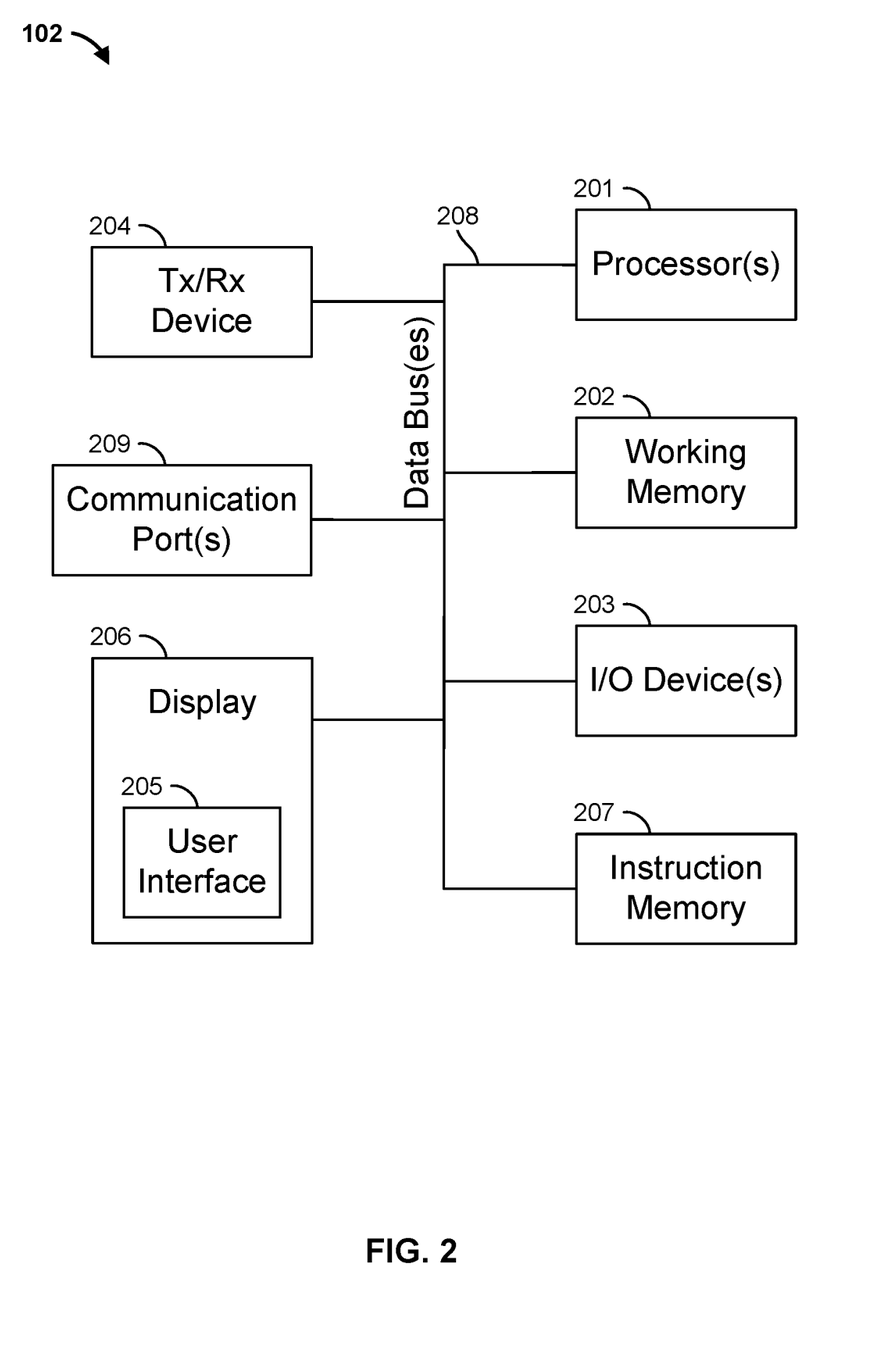
FIG. 2 is a block diagram of the carousel customization computing device of the digital carousel customization system of FIG. 1 in accordance with some embodiments.

FIG. 2 illustrates the carousel customization computing device 102 of FIG. 1. Carousel customization computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of carousel customization computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with carousel customization computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 carousel customization computing device 102 will be operating in. Processor(s) 201 is operable to receive data from, or send data to, a network, such as communication network 118 of FIG. 1, via transceiver 204.

Figure 3:
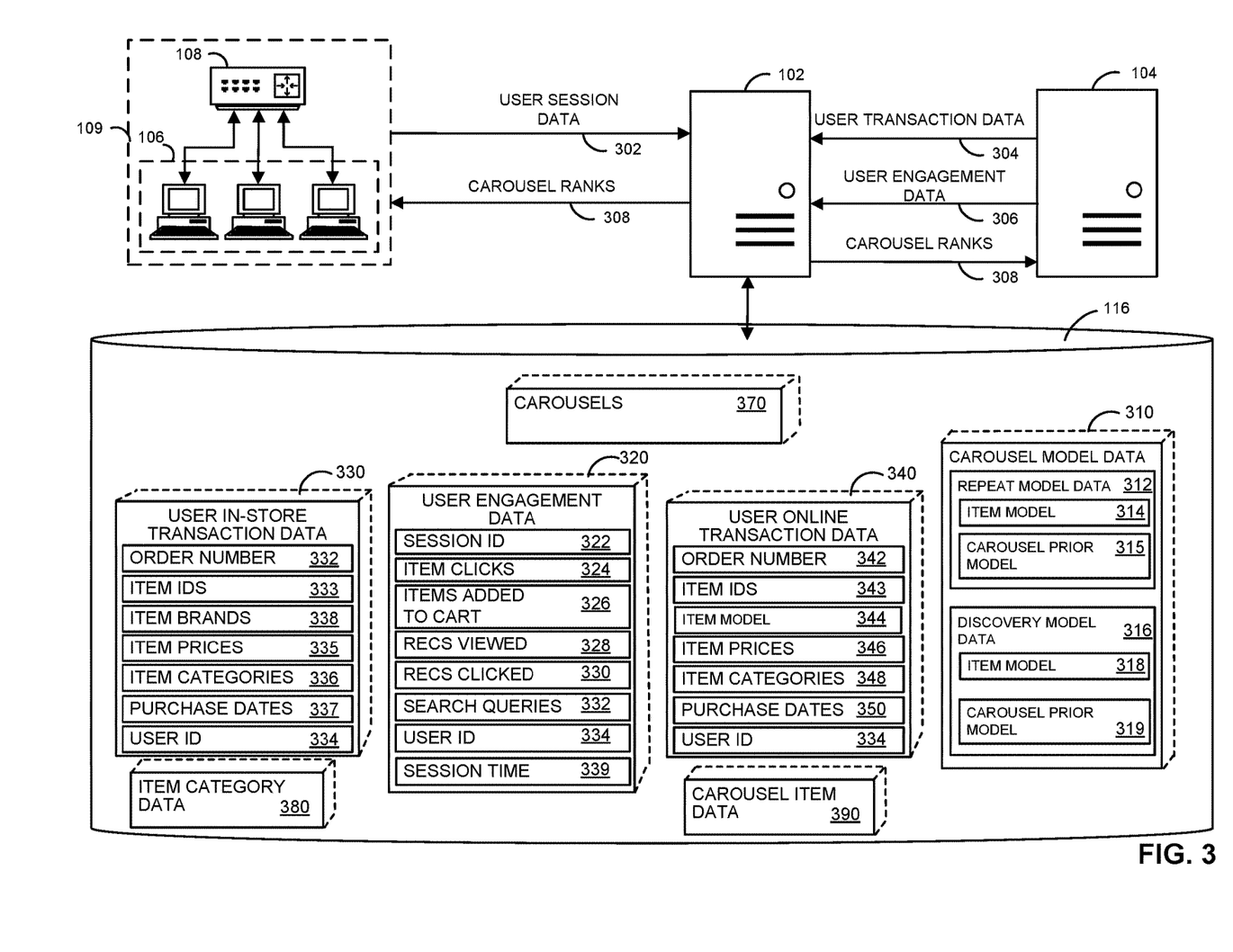
FIG. 3 is a block diagram illustrating examples of various portions of the digital carousel customization system of FIG. 1 in accordance with some embodiments.

FIG. 3 is a block diagram illustrating examples of various portions of the digital carousel customization system 100 of FIG. 1. As indicated in the figure, carousel customization computing device 102 may receive user in-store purchase data 302 from store 109. User in-store purchase data 302 may identify and characterize items purchased by a user (e.g., customer) at store 109. For example, user in-store purchase data 302 may identify a history of items purchased with in stores or online for the customer. Carousel customization computing device 102 may parse user in-store purchase data 302 to identify items in each purchase transaction, and may store the parsed data in database 116 as user in-store transactions data 330. For example, user in-store transaction data 330 may include an order number 332 identifying the purchase, item IDs 333 identifying one or more items purchased in the purchase, item brands 338 identifying a brand for each item purchased, item prices 335 identifying the price of each item purchased, item category 336 identifying a category of each item purchased, a purchase date 337 identifying the purchase date of the purchase order, and user ID 334 for the user making the corresponding purchase (e.g., a phone number, a login ID, a name, etc.).

Similarly, carousel customization computing device 102 may receive online purchase data 304 from web server 104. Online purchase data 304 may identify and characterize items purchased by a customer on a website hosted by web server 104. For example, online purchase data 304 may identify a history of items purchased online by each customer. Carousel customization computing device 102 may parse online purchase data 304 to identify items in each purchase transaction, and may store the parsed data in database 116 as user online transaction data 340. User online transaction data 340 may include an order number 342 identifying a purchase order, item IDs 343 identifying one or more items purchased in the purchase order, item brands 344 identifying a brand for each item purchased, item prices 346 identifying the price of each item purchased, item categories 348 identifying a category of each item purchased, a purchase date 350 identifying the purchase date of the purchase order, and user ID 334 for the user making the corresponding purchase.

Carousel customization computing device 102 may also receive user session data 306 from web server 104. User session data 306 identifies, for a user, data related to a browsing session, such as when the user is browsing a retailer's webpage hosted by web server 104. For example, user session data 306 may identify a history of user session each customer. Carousel customization computing device 102 may store the user session data 306 as user engagement data 320 in database 116. In this example, user engagement data 320 may include a session ID 322, item clicks 324 identifying items which the user clicked (e.g., images of items for purchase, keywords to filter reviews for an item), items added-to-cart 326 identifying items added to the user's online shopping cart, recommendations viewed 328 identifying recommendations the user viewed during the browsing session, recommendations clicked 323 identifying recommendations the user clicked on, search queries 325 identifying one or more searches conducted by the user during the browsing session, user ID 334 ID (e.g., a customer ID, retailer website login ID, etc.), and a session time 329, time spent by user during each session.

Based on one or more of user engagement data 320, user online transaction data 340, and user in-store transaction data 330, carousel customization computing device 102 may generate carousel ranks 308 for each user (i.e., customer). The carousel ranks may be used to determine an order of carousel to be presented for the customer.

For example, carousel model data 310, stored in database 116, may identify and characterize an algorithm that, when executed, can score and rank carousels for a user. For example, carousel model data 310 may identify and characterize a model based on equation (14) above.

Carousel customization computing device 102 can, based on one or more of user engagement data 320, user online transaction data 340, and user in-store transaction data 330, generate scores and corresponding ranks for potential carousels 370 for a user. Each carousel may be associated with carousel item data 390 identifying and characterizing items (e.g., ranked items) in each carousel. Each carousel may also be associated with item category data 380 identifying and characterizing a category (e.g., car, animals, fruits, vegetables, drinks, etc.) associated with each item in the carousel. For example, item category data 380 may identify categories, and sub-categories, for each item that is sold either in-store (e.g., at store 109), or online (e.g., via a website hosted by web server 104). A user may add, remove, or rearrange categories in item category data 380 via, for example, carousel customization computing device 102.

Carousel model data 310 may include repeat model data 312 identifying and characterizing a repeat model including an algorithm to generate user-carousel repeat score for each carousel (e.g., based on equations (10) or (11) above). The repeat model data 312 may further include an item model 314 identifying and characterizing an algorithm for generating user-item affinity scores for items in each carousel, for example, based on equation (5) above. Further, the repeat model data 312 may further include a carousel prior model 315 identifying and characterizing an algorithm for generating user-carousel prior scores for items in each carousel, for example, based on equation (9) above. The generated user-item affinity scores and user-carousel prior score for a carousel may be aggregated by repeat model in the repeat model data 312 to generate user-carousel repeat score for corresponding carousel using an aggregation algorithm in equation (11) above.

Further, carousel model data 310 may include discovery model data 316 identifying and characterizing a category model including an algorithm to generate user-carousel discovery scores for each carousel (e.g., based on equation (12) or (13) above). Discovery model data 316 may further include a category model 318 identifying and characterizing an algorithm for generating user-category discovery scores for each item and/or category in a corresponding carouse, for example, based on equation (6) above. The generated user-category scores for a carousel may be aggregated by discovery model in the discovery model data 316 to generate user-carousel discovery scores for each carousel using an aggregation algorithm. Carousel model data 310 may aggregate the user-carousel repeat scores and user-carousel discovery scores for corresponding carousels to generate final user-carousel scores, for example using equation (14) above. Carousels may then then be ranked using the final user-carousel scores and the carousel ranks 308 may be provided to the web server 104 for presentation to the user.

Figure 4:
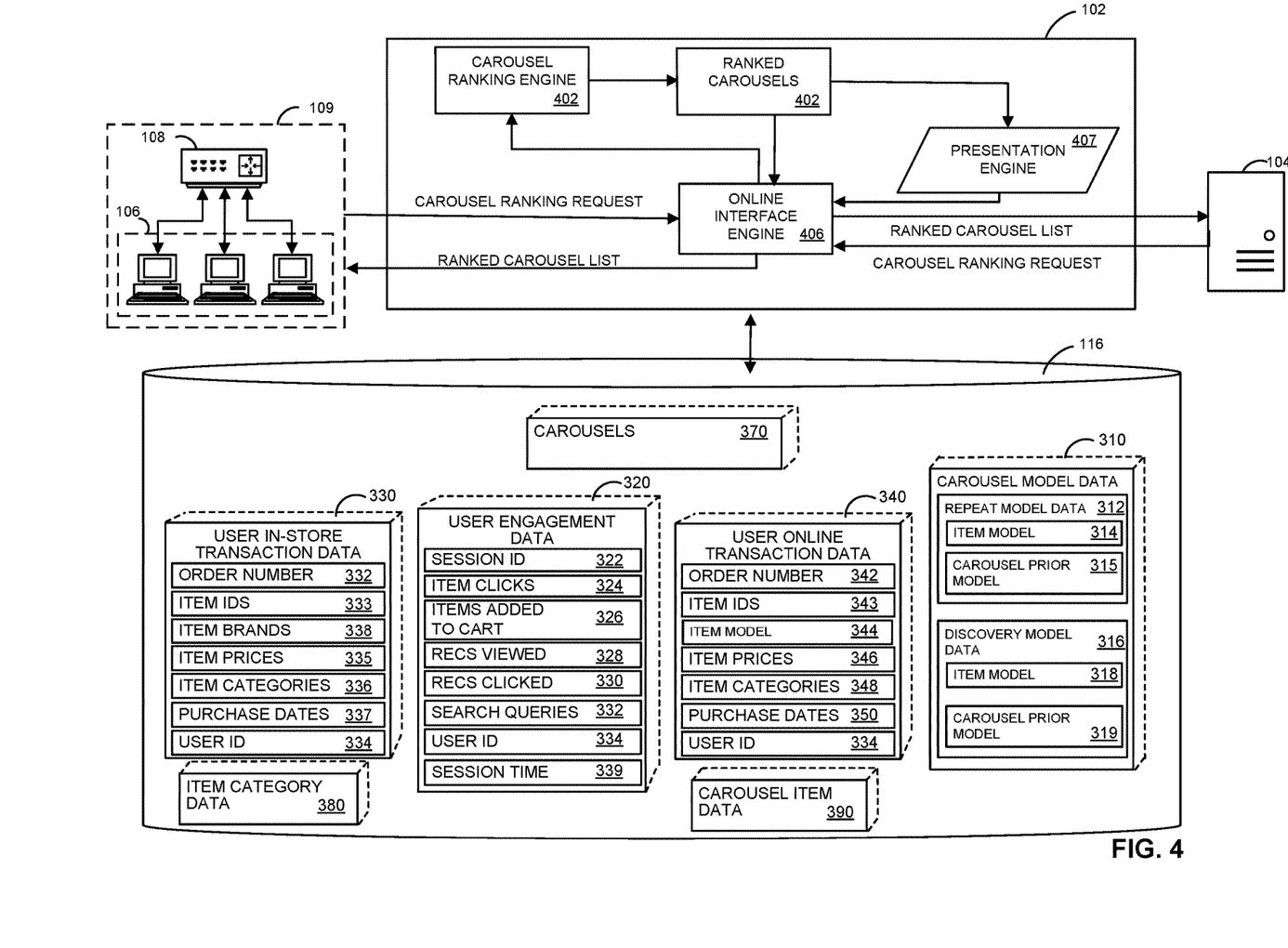
FIG. 4 of a block diagram illustrating examples of various portions of the carousel customization computing device of FIG. 1 in accordance with some embodiments.

FIG. 4 is a block diagram illustrating a more detailed view of carousel customization computing device 102. Specifically, carousel customization computing device 102 includes carousel ranking engine 402, presentation engine 407, and online interface engine 406. In some examples, one or more of carousel ranking engine 402, presentation engine 407, and online interface engine 406 are implemented in hardware. In some examples, one or more of carousel ranking engine 402, presentation engine 407, and online interface engine 406 are implemented as an executable program maintained in a tangible, non-transitory memory, such as instruction memory 207 of FIG. 2, which may be executed by one or processors, such as processor 201 of FIG. 2. For example, carousel engine 402 may obtain from database 116 carousel model data 310 and may execute carousel model(s) included in the carousel model data 310.

In this example, store 109 (e.g., via workstations 106) transmits a carousel ranking request 403 to carousel customization computing device 102. Carousel ranking request 403 may include a request for a sequence of carousels for presentation to a particular user using the workstations 106 at store 109. In some examples, carousel ranking request 403 further identifies a user (e.g., customer) for whom the carousels are requested at store 109. Online interface engine 406 receives carousel ranking request 403, and parses and extracts the data received. Online interface engine 406 provides to the carousel ranking engine 402 the extracted data, which may include the user in-store transaction data 330, user engagement data 320 and user online transaction data 340 extracted from database 116.

Carousel ranking engine 402 can determine final user-carousel ranks and scores for the user-carousel pairs for the particular user of store 109 based on the user in-store transaction data 330, user engagement data 320 and user online transaction data 340 extracted from database 116 for the user. Carousel ranking engine 402 generates ranked carousels 404 identifying and characterizing the final ranked carousels for the particular user, and provides ranked carousels 404 to presentation engine 407.

Presentation engine 407 can determine an ordered list of the carousels based on the ranked carousels 404 received from the carousel ranking engine 402. Presentation engine 407 may generate data that identifies the order of carousels associated with the particular user to optimize user interactions with items in the carousels.

Online interface engine 406 may receive the ordered list of the carousels from the presentation engine 407 in a data format (e.g., message) acceptable by store 109 as identified by ranked carousel list 410. Online interface engine 406 transmits ranked carousel list 410 to store 109. Store 109 may then update or generate carousels for presentation to the user via workstations 106 based on the ranked carousel list 410.

Figure 5:
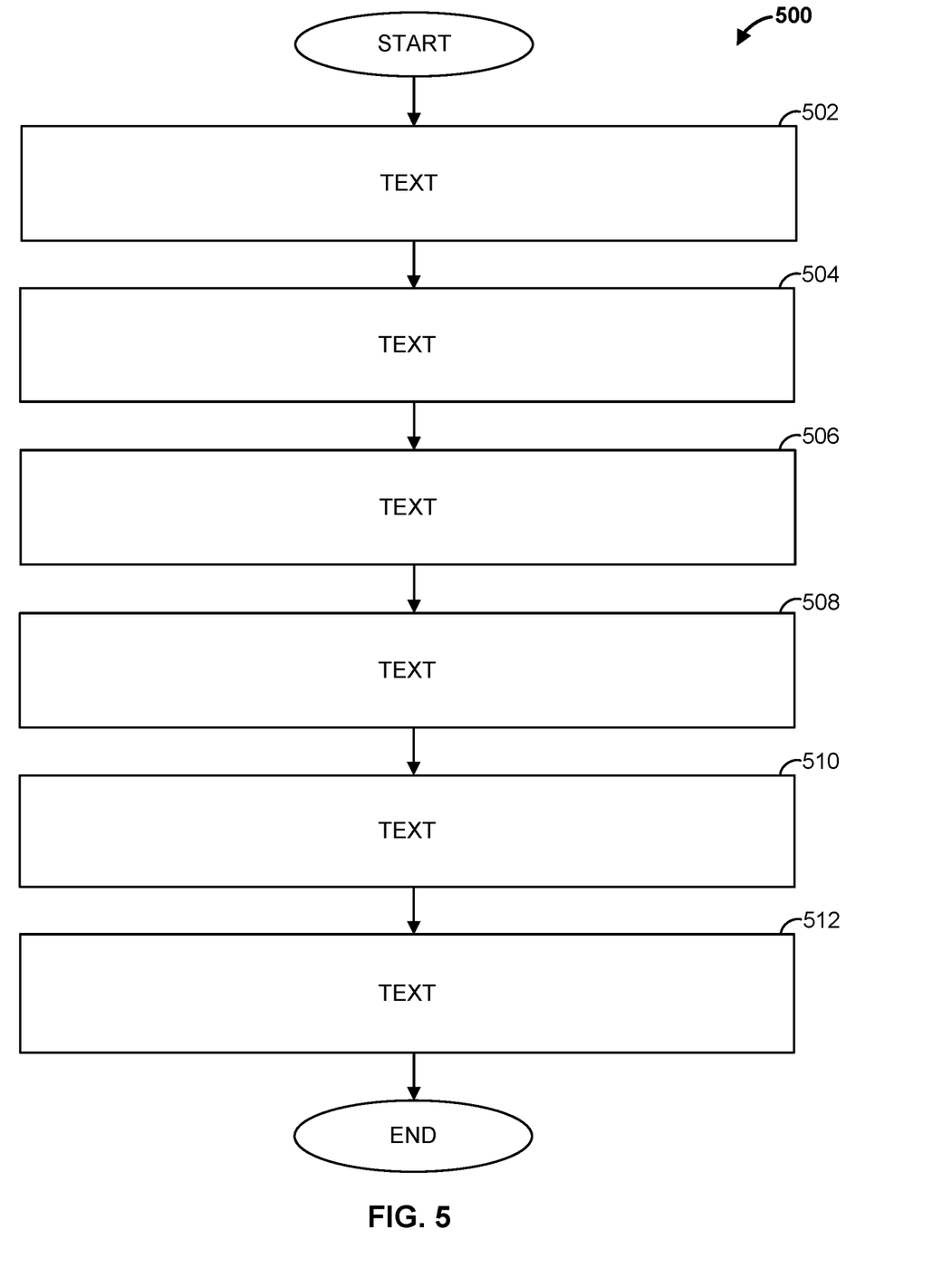
FIG. 5 is a flowchart of an example method that can be carried out by the digital carousel customization system of FIG. 1 in accordance with some embodiments.

FIG. 5 is a flowchart of an example 500 that can be carried out by the digital carousel customization system 100 of FIG. 1. Beginning at step 502, user data is obtained for a user. For example, carousel customization computing device 102 may obtain user in-store transaction data 330, user online transaction data 340, and user engagement data 320 from database 116 for the user. At step 504, a plurality of carousels is obtained, with each carousel including a set of items. For example, carousels 370 may be obtained by carousel customization computing device, each carousel including a set of ranked items.

At step 506, a user-carousel score is determined for each carousel of the plurality of carousels based on the user data. For example, carousel customization computing device 102 may compute a user-carousel score for each carousel based on the user in-store transaction data 330, user online transaction data 340, and user engagement data 320.

At step 508, the plurality of carousels is presented to the user, via user interface based on the user-carousel scores. For example, carousel customization computing device 102 may provide the carousels for presented to the store 109 based on the scores. The method then ends.

Figure 6:
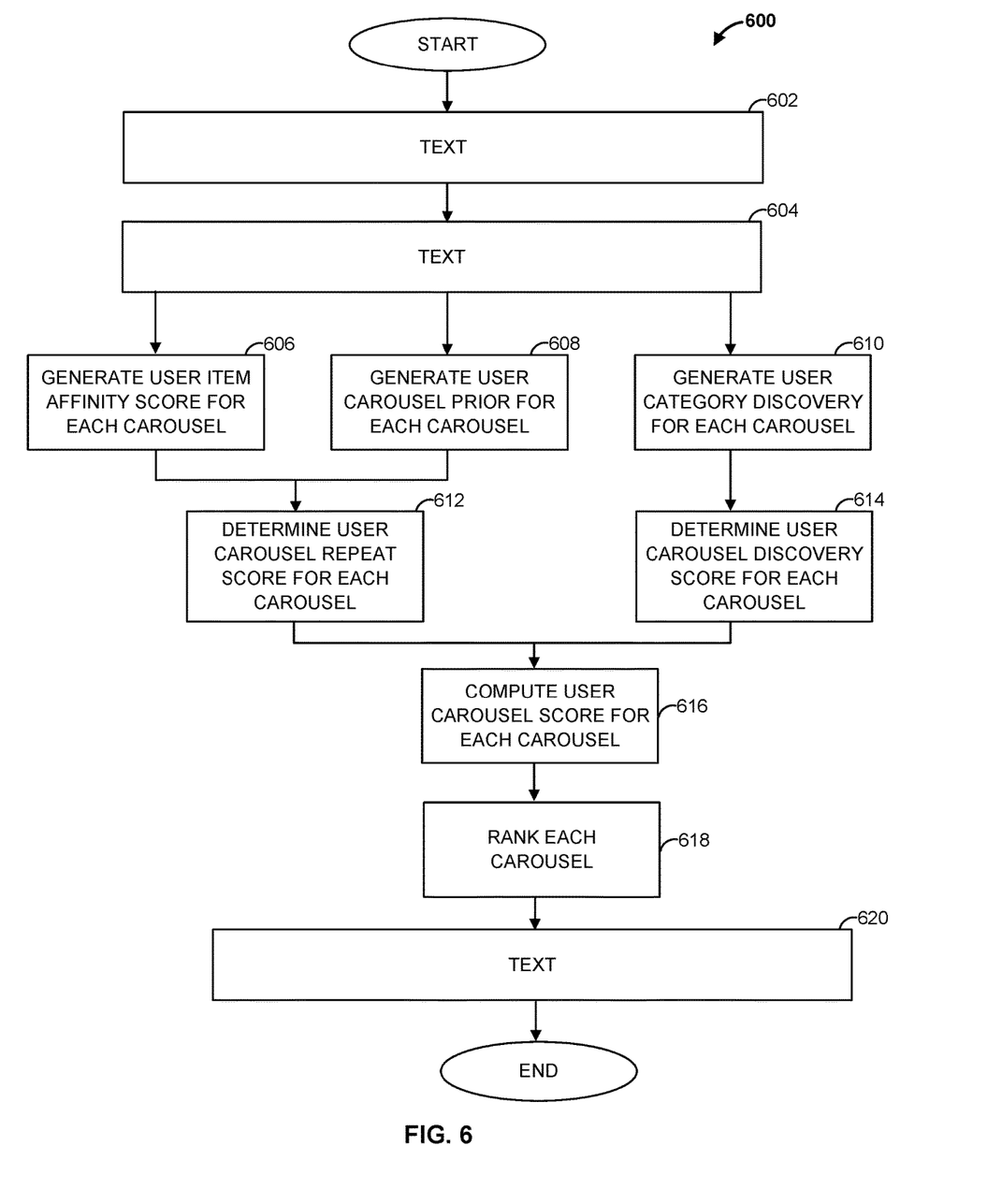
FIG. 6 is a flowchart of another example method that can be carried out by the digital carousel customization system of FIG. 1 in accordance with some embodiments.

FIG. 6 is a flowchart of an example method 600 that can be carried out by the digital carousel customization system 100 of FIG. 1. At step 602, a computing device, such as carousel customization computing device 102, obtains user data is obtained for a user. For example, carousel customization computing device 102 may obtain user in-store transaction data 330, user online transaction data 340, and user engagement data 320 from database 116 for the user. At step 604, a plurality of carousels is obtained, with each carousel including a set of items. For example, carousels 370 may be obtained by carousel customization computing device 102, each carousel including a set of ranked items.

Proceeding to step 606, user-item affinity scores may be generated for each carousel based on the user data. For example, user transaction data (e.g., in-store user transaction data 330 and online user transaction data 340) may be used to determine user-item affinity scores for each user-item pair for each carousel. At step 608, user-carousel prior score may be generated for each carousel of the plurality of carousels based on the user data. For example, carousel customization computing device 102 may generate a user-carousel prior score for a corresponding carousel based on prior interactions of the user with the carousel as indicated in the user engagement data 320.

At step 610, user-category discovery scores may be generated for each category within each carousel of the plurality of carousels. For example, carousel customization computing device 102 may generate for each carousel, user-category discovery scores for each category within the corresponding carousel based on user in-store transaction data 330, user online transaction data 340, and user engagement data 320 from database 116 for the user.

Further, at step 612, user carousel repeat score for each carousel of the plurality of carousels may be determined. For example, carousel customization computing device 102 may aggregate user-item affinity scores and user-carousel prior score for a corresponding carousel to determine a user-carousel repeat score. At step, 614, user carousel discovery score is determined for each carousel of the plurality of carousels. For example, carousel customization computing device 102 may aggregate user-category discovery scores for a corresponding carousel to determine a user-carousel discovery score for the carousel.

Proceeding to step 616, a user-carousel score may be computed for each carousel in the plurality of carousels based on the corresponding user-carousel repeat score and the user-carousel discovery score. For example, carousel customization computing device 102 may aggregate the user-carousel repeat score and the user-carousel discovery score for a corresponding carousel to compute a final user-carousel score for the carousel. At step 618, the carousels may be ranked based on the corresponding user-carousel scores. For example, carousel ranking engine 402 generated ranked carousels 404 based on the user-carousel scores of the carousels.

Following step 618, the method proceeds to step 620, where the plurality of carousels is displayed to the user. For example, carousel customization computing device 102 may provide the carousels for display to the user based on the ranks of the carousels. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a computing device configured to:
obtain user data associated with a user from a database during a session on a user device;
obtain a plurality of carousels, each carousel including a set of items;
compute, for the user, a user-carousel repeat score indicating a likelihood of the user interacting with previously selected items in each carousel of the plurality of carousels based on prior interactions with the corresponding carousel and the corresponding set of items indicated in the user data;
compute, for the user, a user-carousel discovery score indicating a likelihood of the user interacting with previously unseen items in each carousel of the plurality of carousels based on prior interactions indicated in the user data;
determine a user-carousel score for each carousel of the plurality of carousels based on the user-carousel repeat score and the user-carousel discovery score, the user-carousel score indicating a likelihood of the user interacting with each corresponding carousel; and
cause to present, via a user interface of the user device, the plurality of carousels to the user device based at least in part on the corresponding user-carousel scores.

2. The system of claim 1, wherein the user data includes user engagement data and user transaction data.

3. The system of claim 2, wherein the user engagement data includes one or more of user clicks, add to carts, carousel impressions, and item impressions.

4. The system of claim 1, wherein the computing device is further configured to:
for each carousel of the plurality of carousels, determine a user-item affinity score associated with item in the set of items based on user data, the user-item affinity score indicating a propensity of the user to buy the item;
for each carousel of the plurality of carousels, determine a user-carousel prior score based on user data, the user-carousel prior score indicating a likelihood of the user interacting with the carousel based on past interaction with the carousel; and
determine, for each carousel of the plurality of carousels, the user-carousel repeat score based on the corresponding user-item affinity scores and the corresponding user-carousel prior score.

5. The system of claim 1, wherein the computing device is further configured to:
for each carousel of the plurality of carousels, determine a user-category discovery score associated with each item in the set of items based on user data, the user-category discovery score indicating a likelihood of the user interacting with previously unseen items in the corresponding category; and determine, for each carousel of the plurality of carousels, the user-carousel discovery score based on the corresponding user-category discovery scores for the corresponding carousel.

6. The system of claim 1, wherein the computing device is further configured to rank the plurality of carousels based on the corresponding user-carousel scores, and the plurality of carousels are caused to present in an order based on the corresponding ranks.

7. A method comprising:
obtaining user data associated with a user from a database during a session on a user device;
obtaining a plurality of carousels, each carousel including a set of items;
computing, for the user, a user-carousel repeat score indicating a likelihood of the user interacting with previously selected items in each carousel of the plurality of carousels based on prior interactions with the corresponding carousel and the corresponding set of items indicated in the user data;
computing, for the user, a user-carousel discovery score indicating a likelihood of the user interacting with previously unseen items in each carousel of the plurality of carousels based on prior interactions indicated in the user data;
determining a user-carousel score for each carousel of the plurality of carousels based on the user-carousel repeat score and the user-carousel discovery score, the user-carousel score indicating a likelihood of the user interacting with each corresponding carousel; and
causing to present, via a user interface of the user device, the plurality of carousels to the user device based at least in part on the corresponding user-carousel scores.

8. The method of claim 7, wherein the user data includes user engagement data and user transaction data.

9. The method of claim 8, wherein the user engagement data includes one or more of user clicks, add to carts, carousel impressions, and item impressions.

10. The method of claim 7, the method further comprising:
for each carousel of the plurality of carousels, determining a user-item affinity score associated with item in the set of items based on user data, the user-item affinity score indicating a propensity of the user to buy the item;
for each carousel of the plurality of carousels, determining a user-carousel prior score based on user data, the user-carousel prior score indicating a likelihood of the user interacting with the carousel based on past interaction with the carousel; and
determining, for each carousel of the plurality of carousels, the user-carousel repeat score based on the corresponding user-item affinity scores and the corresponding user-carousel prior score.

11. The method of claim 7, the method further comprising:
for each carousel of the plurality of carousels, determining a user-category discovery score associated with each item in the set of items based on user data, the user-category discovery score indicating the likelihood of the user interacting with previously unseen items in the corresponding category; and
determining, for each carousel of the plurality of carousels, the user-carousel discovery score based on the corresponding user-category discovery scores for the corresponding carousel.

12. The method of claim 7, the method further comprising ranking the plurality of carousels based on the corresponding user-carousel scores, and causing to present the plurality of carousels in a sequential order based on the corresponding ranks.

13. A non-transitory computer readable medium having instructions stored thereon, wherein the instructions, when executed by at least one processor, cause a device to perform operations comprising:
obtaining user data associated with a user from a database during a session on a user device;
obtaining a plurality of carousels, each carousel including a set of items;
computing, for the user, a user-carousel repeat score indicating a likelihood of the user interacting with previously selected items in each carousel of the plurality of carousels based on prior interactions with the corresponding carousel and the corresponding set of items indicated in the user data;
computing, for the user, a user-carousel discovery score indicating a likelihood of the user interacting with previously unseen items in each carousel of the plurality of carousels based on prior interactions indicated in the user data;
determining a user-carousel score for each carousel of the plurality of carousels based on the user-carousel repeat score and the user-carousel discovery score, the user-carousel score indicating a likelihood of the user interacting with each corresponding carousel; and
causing to present, via a user interface of the user device, the plurality of carousels to the user device based at least in part on the corresponding user-carousel scores.

14. The non-transitory computer readable storage medium of claim 13, wherein the user data includes user engagement data and user transaction data.

15. The non-transitory computer readable storage medium of claim 14, wherein the user engagement data includes one or more of user clicks, add to carts, carousel impressions, and item impressions.

16. The non-transitory computer readable storage medium of claim 13, the operations further comprising:
for each carousel of the plurality of carousels, determining a user-item affinity score associated with item in the set of items based on user data, the user-item affinity score indicating a propensity of the user to buy the item;
for each carousel of the plurality of carousels, determining a user-carousel prior score based on user data, the user-carousel prior score indicating a likelihood of the user interacting with the carousel based on past interaction with the carousel; and
determining, for each carousel of the plurality of carousels, the user-carousel repeat score based on the corresponding user-item affinity scores and the corresponding user-carousel prior score.

17. The non-transitory computer readable storage medium of claim 13, the operations further comprising:
for each carousel of the plurality of carousels, determining a user-category discovery score associated with each item in the set of items based on user data, the user-category discovery score indicating the likelihood of the user interacting with previously unseen items in the corresponding category; and
determining, for each carousel of the plurality of carousels, the user-carousel discovery score based on the corresponding user-category discovery scores for the corresponding carousel.

* * * * *